Oct. 13, 1931.  R. S. MOORE  1,827,253
AIRPLANE
Filed Nov. 25, 1927
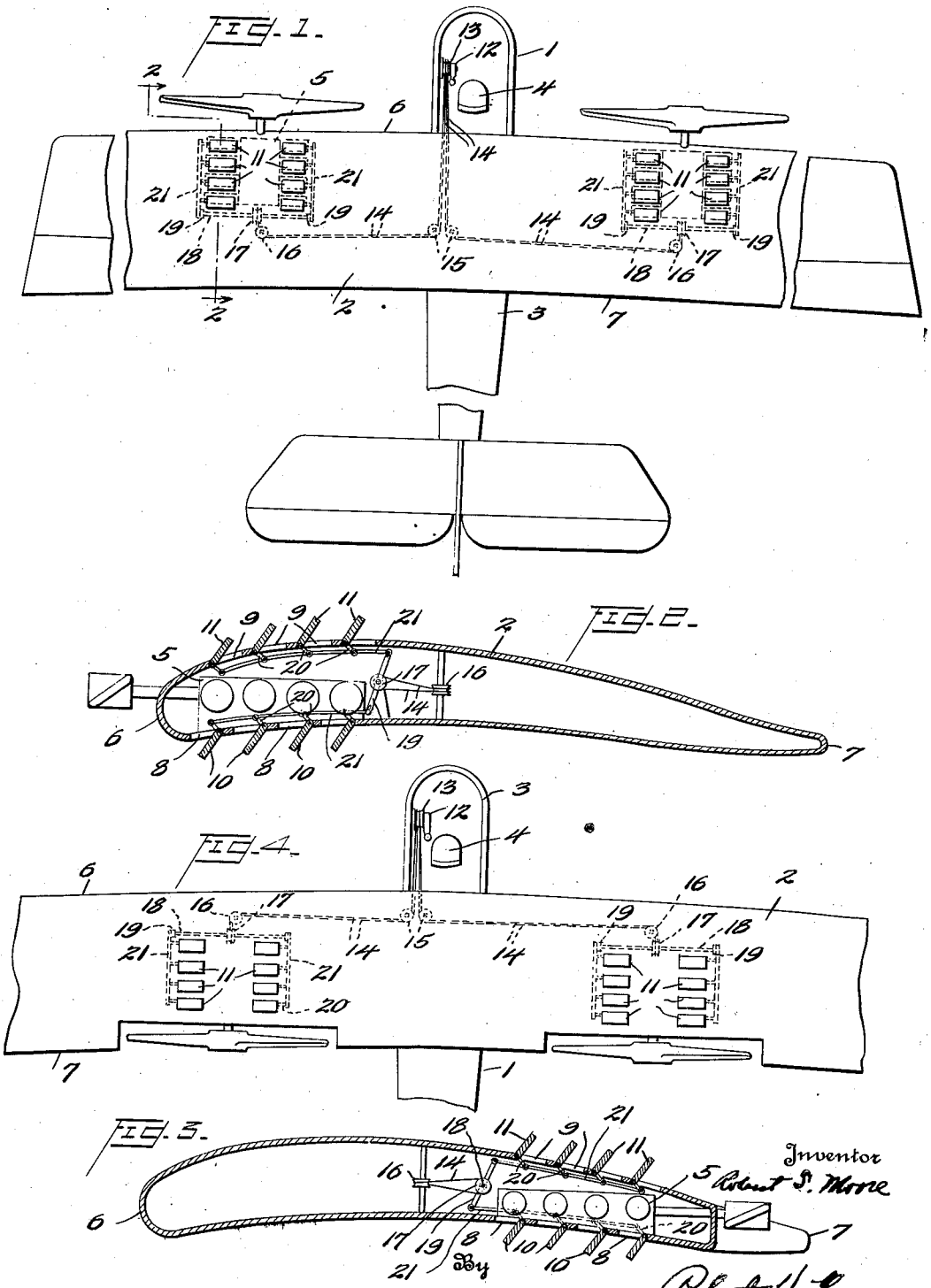

Patented Oct. 13, 1931

1,827,253

UNITED STATES PATENT OFFICE

ROBERT S. MOORE, OF SILVER SPRING, MARYLAND

AIRPLANE

Application filed November 25, 1927. Serial No. 235,657.

This invention relates to aeronautics, but more particularly to airplanes, and the invention has for its object to provide an aircraft of this class wherein the engine or motive power is disposed in the wing or wings of the same.

A further object of the invention is to provide an airplane, the wing or wings of which accommodate one or more engines and which in addition include devices for introducing cooling air into the wing or wings of the airplane for cooling the said engine or engines.

A further object of the invention is to provide suitable and efficient means for controlling the admission of air within the wing or wings of an airplane for cooling an engine or engines mounted within the said wing or wings.

With these and other objects in view, the invention consists of the novel arrangement and combination of parts and also in certain details of construction, all of which will be first fully described and afterwards specifically pointed out in the appended claims.

Referring to the accompanying drawings:

Figure 1 is a top plan view of an airplane illustrating a wing structure constructed in accordance with this invention;

Figure 2 is a vertical transverse sectional view through the wing taken on line 2—2 of Figure 1;

Figure 3 is a similar view illustrating a modified form; and

Figure 4 is a fragmentary top plan view of the modified form shown in Figure 3.

Like numerals of reference indicate the same parts throughout the several figures, in which:

1 indicates an airplane which for the purpose of illustration, I have shown as of the monoplane type, though my invention is equally well adapted to biplanes, triplanes, etc. of either land, water or amphibian type.

2 indicates the wing of the airplane, and 3 the fuselage having a pilot's seat 4. Said wing is provided with the usual upper and lower supporting surfaces which serve as a sole support for the airplane. These surfaces are spaced apart to receive an engine in the interior of the wing.

Disposed within the wing 2 is an engine or engines 5, which may be located near the leading edge 6 of the wing as shown in Figure 2, or which may be near the trailing edge 7 as shown in Figure 3, or which may be at both the leading and trailing edges as a composite of Figures 2 and 3 suggests. The engine, as clearly shown in Figs. 2 and 3, is a horizontally opposed cylinder engine. This enables an engine to be put in a wing of standard dimensions which has sufficient power to propel the airplane.

Disposed in the under surface of the wing 2 and directly under the engine 5 and preferably in alignment with the cylinders of the engine 5, I dispose a series of slots or openings 8 in line with the longitudinal axis of the wing 2, and in the upper surface of the wing, I similarly arrange a series of similar slots or openings 9. At the rear edge of each of the lower slots 8, I hinge a shutter 10 so shaped and formed as to completely close the said lower slots 8 when said shutters are retracted into inactive position, and at the forward edge of each of the said upper slots 9, I hinge a similar shutter 11 which may be retracted to close the said slots 9. The operative position of both series of shutters 10 and 11, with relation to their respective slots 8 and 9, is as shown in Figures 2 and 3, or in some intermediate position between said position and a full-retracted position, for by means of a suitable shutter operating mechanism such as will be presently described, the said openings at the said shutters may be regulated in order to control the quantity of cooling air passing to the engine 5.

The construction and arrangement of this mechanism may be and necessarily would be governed by the type and construction of the airplane, wings, etc., but in the embodiment shown in the accompanying drawings, I provide adjacent the pilot's seat 3, a pivoted lever-arm 12 and a pulley 13 over which cables 14 lead to pulleys 15 and thence longitudinally of the wing 2 to pulleys 16 and then forwardly to pulleys 17 fixed to a jack-shaft 18, to the ends of which are fixed levers 19, pivotally connected to the lever arms 20 which lever-arms 20 are fixed to the shutters 10 and 11, as shown in Figures 2 and 3.

Connecting each lever-arm 20 of each series of lever-arms is a link 21 by means of which the movement of each series of shutters is simultaneously effected.

Each of the engines 5 drives a shaft 22 and a propeller 23 disposed in relation to the wing 2 as shown in the drawings.

In operation, the lever arm 12 is moved by the pilot, which movement, through the medium of the operating mechanism just described, either opens or closes the shutters 10 and 11 as just described.

When the shutters are in open position, the forward movement of the wing 2 through the air, causes air to be directed through the lower series of slots 8, by the lower series of shutters 10 to supply to the adjacent cylinders of the engine cooling air to properly and efficiently cool the same. At the same time the air passing over the upper surface of the wing and across the openings 9 at the shutters 11, creates a minus pressure at said openings 9 to aspirate the air from within the wing 2 and adjacent to the engine 5, thereby causing a strong and continuous flow of air through the said wing and directly across the cylinders of the engine 5.

The lower shutters 10 being pivoted at the rear edges of the lower slots 8 so that the slots lie forward of the shutters cause the slots to positively take in the air on account of the upward pressure or lift acting against the under surface of the wing. In like manner the upper shutters 11 being pivoted at the front edges of the upper slots 9 so that the slots lie behind the shutters, cause the air within the wing and surrounding the motor to be positively drawn out on account of the negative pressure or upward lift acting upon the upper surface of the wing.

Having thus fully described the invention, I do not wish to be understood as limiting myself to the exact construction herein set forth, but consider myself clearly entitled to all such changes and modifications as fall within the limit and scope of the appended claims.

What I claim as new and desire to secure by Letters Patent of the United States, is:

1. An airplane including a wing having its upper and lower surface spaced apart to receive an engine in the interior of the wing, the lower surface of the wing adjacent to the engine having provided therein a series of slots, a series of shutters pivoted adjacent the rear edge of said slots, the upper surface of the wing adjacent to the engine being provided with a series of slots, a series of shutters pivoted adjacent the forward edge of said slots, means for connecting the shutters of the upper series of shutters together, means for connecting the shutters of the lower series of shutters together, and additional means for actuating both series of shutters simultaneously to open and close the same.

2. An airplane including a wing having its upper and lower surfaces spaced apart to receive a plurality of engines in the interior of the wing, the lower surface of the wing adjacent to the engine and the upper surface of the wing adjacent to the engine being each provided with a series of slots, a series of shutters for each series of slots, the upper series of shutters being pivoted adjacent the front edge of the upper slots, the lower series of shutters being pivoted adjacent the rear edge of the lower slots, means for connecting the shutters of each series of shutters together, and additional means for actuating both series of shutters simultaneously to open and close the same.

3. An airplane including a wing having its upper and lower surfaces spaced apart to receive an engine in the interior of the wing, the upper and lower surfaces of the wing being provided with shutter controlled openings disposed therein adjacent the said engine, and means for controlling said shutter controlled openings, the whole arranged whereby the upward pressure or lift acting against the under surface of the wing positively forces the air into the lower slots, and the negative pressure or lift acting upon the upper surface of the wing positively draws the air surrounding the engine out of the wing.

4. An airplane including a wing having its upper and lower surfaces spaced apart to receive an engine in the interior of the wing, the opposed surfaces of the wing adjacent the engine being provided with a series of shutter controlled openings, and means for controlling said shutter controlled openings, the whole arranged whereby the upward pressure or lift acting against the under surface of the wing positively forces the air into the lower slots, and the negative pressure or lift acting upon the upper surface of the wing positively draws the air surrounding the engine out of the wing.

5. An airplane including a wing having its upper and lower surfaces spaced apart to receive an engine in the interior of the wing, the opposed surfaces of the wing adjacent the engine being provided with a series of shutter controlled openings, the whole arranged whereby the upward pressure or lift acting against the under surface of the wing positively forces the air into the lower slots, and the negative pressure or lift acting upon the upper surface of the wing positively draws the air surrounding the engine out of the wing.

6. In an airplane, the combination with a wing having its upper and lower supporting surfaces spaced apart to receive an engine in the interior of the wing, of a horizontally opposed cylinder engine disposed within the interior of the wing between the upper and lower surfaces thereof and providing a motive power for the airplane, said wing having a series of upper openings and a series of lower openings with shutters for controlling the same, whereby the upward pressure or lift acting against the under surface of the wing positively forces the air into the lower openings and the negative pressure or lift acting upon the upper surface of the wing positively draws the air surrounding the engine out of the wing.

In testimony whereof I affix my signature.

ROBERT S. MOORE.